United States Patent
Roberts

(10) Patent No.: US 10,558,305 B2
(45) Date of Patent: Feb. 11, 2020

(54) TOUCH SENSORS

(71) Applicant: TouchNetix Limited, Hampshire (GB)

(72) Inventor: Stephen William Roberts, Winchester (GB)

(73) Assignee: TouchNetix Limited, Fareham, Hampshire (GB)

(\*) Notice: Subject to any disclaimer, the term of this patent is extended or adjusted under 35 U.S.C. 154(b) by 151 days.

(21) Appl. No.: 15/503,061

(22) PCT Filed: Aug. 13, 2015

(86) PCT No.: PCT/GB2015/052337
§ 371 (c)(1),
(2) Date: Feb. 10, 2017

(87) PCT Pub. No.: WO2016/038329
PCT Pub. Date: Mar. 17, 2016

(65) Prior Publication Data
US 2017/0228070 A1    Aug. 10, 2017

(30) Foreign Application Priority Data
Sep. 8, 2014   (GB) .................................. 1415829.9

(51) Int. Cl.
*G06F 3/044*    (2006.01)

(52) U.S. Cl.
CPC .... *G06F 3/044* (2013.01); *G06F 2203/04112* (2013.01)

(58) Field of Classification Search
CPC . G06F 3/044; G06F 3/041; G06F 2203/04112
See application file for complete search history.

(56) References Cited

U.S. PATENT DOCUMENTS

| 2011/0210934 A1* | 9/2011 | Lee ........................ G06F 3/044 345/173 |
| 2013/0009905 A1* | 1/2013 | Castillo ................. G06F 3/044 345/174 |

(Continued)

FOREIGN PATENT DOCUMENTS

| JP | H06139005 A | 5/1994 |
| JP | H11 110115 A | 4/1999 |

(Continued)

OTHER PUBLICATIONS

International Search Report and Written Opinion for corresponding Patent Application No. PCT/GB2015/052337 dated Nov. 3, 2015.

(Continued)

*Primary Examiner* — Chad M Dicke
(74) *Attorney, Agent, or Firm* — Renner, Otto, Boisselle & Sklar, LLP

(57) ABSTRACT

A touch sensor comprises a sensor element for sensing the position of an object over a display screen in a first direction and in a second direction. The sensor element comprises a substrate having an electrode pattern disposed thereon to define an array of sensor nodes. The electrode pattern comprises a plurality of conductors arranged to follow portion of a network of lines extending generally in the first direction, wherein each of the lines follows a zigzag (sawtooth) pattern comprising an alternating series of first line segments arranged at a first angle to the first direction and second line segments arranged at a second angle to the first direction, and wherein respective ones of the first line segments in each line are co-linear with respective ones of the first line segments in an adjacent line. Such a configuration leads to a reduced visibility of the conductors overlying the display screen.

17 Claims, 7 Drawing Sheets

(56) References Cited

U.S. PATENT DOCUMENTS

| | | | |
|---|---|---|---|
| 2013/0063371 A1* | 3/2013 | Lee | G06F 3/044 |
| | | | 345/173 |
| 2013/0106441 A1* | 5/2013 | Yilmaz | G06F 3/0414 |
| | | | 324/658 |
| 2013/0127744 A1* | 5/2013 | Shakya | G06F 3/044 |
| | | | 345/173 |
| 2013/0194232 A1 | 8/2013 | Imamura et al. | |
| 2014/0000939 A1* | 1/2014 | Kim | H05K 1/02 |
| | | | 174/250 |
| 2014/0111707 A1* | 4/2014 | Song | G06F 3/044 |
| | | | 349/12 |
| 2014/0225839 A1 | 8/2014 | Dunphy et al. | |
| 2014/0360856 A1 | 12/2014 | Mizumoto et al. | |
| 2015/0331538 A1* | 11/2015 | Hashida | G06F 3/044 |
| | | | 345/174 |
| 2015/0355510 A1* | 12/2015 | Kurasawa | G06F 3/0412 |
| | | | 349/12 |
| 2016/0098120 A1* | 4/2016 | Miyake | G06F 3/044 |
| | | | 345/174 |

FOREIGN PATENT DOCUMENTS

| | | |
|---|---|---|
| JP | 3 175346 B2 | 6/2001 |
| WO | WO 2013/039050 A1 | 3/2013 |

OTHER PUBLICATIONS

Combined Search and Examination Report for corresponding United Kingdom Patent Application No. 1415829.9 dated Mar. 13, 2015.

* cited by examiner

TOUCH SENSORS

This application is a national phase of International Application No. PCT/GB2015/052337 filed Aug. 13, 2015 and published in the English language which claims priority to United Kingdom Patent Application No. 1415829.9 filed Sep. 8, 2014, which are hereby incorporated herein by reference in their entirety.

BACKGROUND OF THE INVENTION

The present invention relates to the field of touch sensors, for example touch sensors for overlying a display screen to provide a touch-sensitive display (touch screen). In particular, embodiments of the invention relate to designs for electrode patterns for such sensors for sensing the presence of one or more touching objects within a two-dimensional sensing area.

A capacitive touch sensor can be generalised as one that uses a physical sensor element comprising an arrangement of electrically conductive electrodes extending over a touch sensitive area (sensing area) to define sensor nodes and a controller chip connected to the electrodes and operable to measure changes in the electrical capacitance of each of the electrodes or the mutual-capacitance between combinations of the electrodes. The electrodes are typically provided on a substrate. In some configurations electrodes are provided on both sides of a substrate, and these may be referred to as two-sided (two-layer) designs. In other configurations electrodes are provided on a single side of a substrate, and these may be referred to as single-sided (single-layer) designs. Single-sided designs are sometimes preferred because they have reduced manufacturing costs as compared to multi-layered designs. However, single-layer designs can be more challenging from a design point of view because of the restricted topology, principally because electrode interconnections cannot cross one another in a single plane.

FIG. 1 schematically shows some principal components of a generic two-sided capacitive touchscreen comprising a physical sensor element 100. The touch screen is represented in plan view (to the left in the figure) and also in cross-sectional view (to the right in the figure).

The touch screen is configured for establishing the position of a touch within a two-dimensional sensing area by providing Cartesian coordinates along an X-direction (horizontal in the figure) and a Y-direction (vertical in the figure). In this example the sensor element 100 is constructed from a substrate 103 that could be glass or plastic or some other insulating material and upon which is arranged an array of electrodes consisting of multiple laterally extending parallel electrodes, X-electrodes 101 (row electrodes), and multiple vertically extending parallel electrodes, Y-electrodes 102 (column electrodes), which in combination allow the position of a touch 109 to be determined. To clarify the terminology, and as will be seen from FIG. 1, the X-electrodes 101 (row electrodes) are aligned parallel to the X-direction and the Y-electrodes 102 (column electrodes) are aligned parallel to the Y-direction. Thus the different X-electrodes allow the position of a touch to be determined at different positions along the Y-direction while the different Y-electrodes allow the position of a touch to be determined at different positions along the X-direction. That is to say in accordance with the terminology used herein, the electrodes are named (in terms of X- and Y-) after their direction of extent rather than the direction along which they resolve position. Furthermore, the electrodes may also be referred to as row electrodes and column electrodes. It will however be appreciated these terms are simply used as a convenient way of distinguishing the groups of electrodes extending in the different directions. In particular, the terms are not intended to indicate any specific electrode orientation. In general the term "row" will be used to refer to electrodes extending in a horizontal direction for the orientations represented in the figures while the terms "column" will be used to refer to electrodes extending in a vertical direction in the orientations represented in the figures.

In some cases, each electrode may have a more detailed structure than the simple "bar" structures represented in FIG. 1, but the operating principles are broadly the same. The sensor electrodes are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided as an alternative to a mouse in laptop computers is usually opaque, and hence can use lower cost copper electrodes and an epoxy-glass-fibre substrate (e.g. FR4). Referring back to FIG. 1, the electrodes are electrically connected via circuit conductors 104 to a controller chip 105, which is in turn connected to a host processing system 106 by means of a communication interface 107. The host 106 interrogates the controller chip 105 to recover the presence and coordinates of any touch or touches present on, or proximate to the sensor 103. In the example, a front cover (also referred to as a lens or panel) 108 is positioned in front of the sensor 103 and a single touch 109 on the surface of the cover 108 is schematically represented.

Note that the touch itself does not generally make direct galvanic connection to the sensor 103 or to the electrodes 102. Rather, the touch influences the electric fields 110 that the controller chip 105 generates using the electrodes 102. With appropriate analysis of relative changes in the electrodes' measured capacitance/capacitive coupling, the controller chip 105 can thus calculate a touch position on the cover's surface as an XY coordinate 111. The host system can therefore use the controller chip to detect where a user is touching, and hence take appropriate action, perhaps displaying a menu or activating some function.

There are many different material combinations and electrode configurations to allow creation of a touch screen and the example discussed above is just one.

A further aspect of capacitive touch sensors relates to the way the controller chip uses the electrodes of the sensor element to make its measurements. There are two main classes of controller in this regard.

A first class is based on measuring what is frequently referred to as "self-capacitance". Reference is made to FIG. 2. In this design of a capacitive sensor, the controller 201 will typically apply some electrical stimulus (drive signal) 202 to each electrode 203 which will cause an electric field to form around it 204. This field couples through the space around the electrode back to the controller chip via numerous conductive return paths that are part of the nearby circuitry 205, product housing 206, physical elements from the nearby surroundings 207 etc., so completing a capacitive circuit 209. The overall sum of return paths is typically referred to as the "free space return path" in an attempt to simplify an otherwise hard-to-visualize electric field distribution. The important point to realise is that the controller is only driving each electrode from a single explicit electrical terminal 208; the other terminal is the capacitive connection via this "free space return path". The capacitance measured by the controller is the "self-capacitance" of the sensor electrode (and connected tracks) relative to free space (or Earth as it is sometimes called) i.e. the "self-capacitance" of the relevant sensor electrode. Touching or approaching the electrode with a conductive element 210, such as a human finger, causes some of the field to couple via the finger through the connected body 213, through free space and back to the controller. This extra return path 211 can be relatively strong for large objects (such as the human body), and so can give a stronger coupling of the electrode's field back to the controller; touching or approaching the electrode hence increases the self-capacitance of the electrode. The controller is configured to sense this increase in capacitance. The increase is strongly proportional to the area 212 of the applied touch and is normally weakly proportional to the touching body's size (the latter typically offering quite a strong coupling and therefore not being the dominant term in the sum of series connected capacitances).

In a common two-layer self-capacitance sensor the electrodes are arranged on an orthogonal grid, generally with a first set of electrodes on one side of a substantially insulating substrate and the other set of electrodes on the opposite side of the substrate and oriented at nominally 90° to the first set. There are also structures where the grid is formed on a single side of the substrate and small conductive bridges are used to allow the two orthogonal sets of electrodes to cross each other without short circuiting. However, these designs are more complex to manufacture and less suitable for transparent sensors. There are also known designs where the electrode pattern is formed on a single side of a substrate and external connections are used to allow the respective electrodes to be appropriately connected, as discussed further below. One set of electrodes is used to sense touch position in a first axis that we shall call "X" and the second set to sense the touch position in the second orthogonal axis that we shall call "Y".

In a self-capacitance touch sensor, the controller can either drive each electrode in turn (sequential) with appropriate switching of a single control channel or it can drive them all in parallel with an appropriate number of separate control channels. In the former sequential case, any neighbouring electrodes to a driven electrode are sometimes grounded by the controller to prevent them becoming touch sensitive when they are not being sensed (remembering that all nearby capacitive return paths will influence the measured value of the actively driven electrode). In the case of the parallel drive scheme, the nature of the stimulus applied to all the electrodes is typically the same so that the instantaneous voltage on each electrode is approximately the same. The drive to each electrode is electrically separate so that the controller can discriminate changes on each electrode individually, but the driving stimulus in terms of voltage or current versus time, is the same. In this way, each electrode has minimal influence on its neighbours (the electrode-to-electrode capacitance is non-zero but its influence is only "felt" by the controller if there is a voltage difference between the electrodes).

The second class of controller is based on measuring what is frequently referred to as "mutual-capacitance". Reference is made to FIG. 3. In this design of a capacitive sensor the controller 301 will sequentially stimulate each of an array of transmitter (driven/drive) electrodes 302 that are coupled by virtue of their proximity to an array of receiver electrodes 303. The resulting electric field 304 is now directly coupled from the transmitter to each of the nearby receiver electrodes; the "free space" return path discussed above plays a negligible part in the overall coupling back to the controller chip when the sensor is not being touched. The area local to and centred on the intersection of a transmitter and a receiver electrode is typically referred to as a "node". Now, on application or approach of a conductive element 305 such as a human finger, the electric field 304 is partly diverted to the touching object 305. An extra return path to the controller 301 is now established via the body 306 and "free-space" in a similar manner to that described above. However, because this extra return path acts to couple the diverted field directly to the controller chip 301, the amount of field coupled to the nearby receiver electrode 303 decreases. This is measured by the controller chip 301 as a decrease in the "mutual-capacitance" between that particular transmitter electrode and receiver electrodes in the vicinity of the touch. The controller senses this change in capacitance of one or more nodes. For example, if a reduction in capacitive coupling to a given Y-electrode is observed while a given X-electrode is being driven, it may be determined there is a touch in the vicinity of where the given X-electrode and given Y-electrode cross within the sensing surface. The magnitude of a capacitance change is nominally proportional to the area 307 of the touch (although the change in capacitance does tend to saturate as the touch area increases beyond a certain size to completely cover the nodes directly under the touch) and weakly proportional to the size of the touching body (for reasons as described above). The magnitude of the capacitance change also reduces as the distance between the touch sensor electrodes and the touching object increases.

In a common two-sided mutual-capacitance sensor the transmitter electrodes and receiver electrodes are arranged as an orthogonal grid, with the transmitter electrodes on one side of a substantially insulating substrate and the receiver electrodes on the opposite side of the substrate. This is as schematically shown in FIG. 3. In FIG. 3 a first set of transmitter electrodes 303 is shown on one side of a substantially insulating substrate 308 and a second set of receiver electrodes 302 is arranged at nominally 90° to the transmitter electrodes on the other side of the substrate. There are also structures where the grid is formed on a single side of the substrate and small insulating bridges, or as discussed below external connections, are used to allow the transmitter and receiver electrodes to be connected to in rows and columns without short circuiting.

By using interpolation between adjacent nodes for both types of capacitive touch sensor a controller chip can typically determine touch positions to a greater resolution than the spacing between electrodes. Also there are established techniques by which multiple touches within a sensing area, and which might be moving, can be uniquely identified and tracked, for example until they leave the sensing area.

For a touch sensor that is transparent, for example because it is intended to overlay a display the electrodes may be provided by a transparent conductor material, such as ITO. However, using transparent conductor materials can be relatively expensive, for example as compared to using copper. Accordingly, it has been proposed to define electrodes for a transparent conductor using a mesh of thin copper traces.

FIG. 4 schematically represents an arrangement of electrodes 34 on one side of a two-sided sensor 30, for example of the kind represented in FIGS. 1, 2 and 3, and in which the electrodes are defined by a mesh of thin copper traces on a substrate 32. Each electrode 34 is defined by an appropriately-shaped region (in this case horizontal bars) comprising a grid of copper wires. In this example the copper wire grid is angled at around 45 degrees to the horizontal/vertical directions and is made of copper wires having a width on the substrate of around 3 microns and a pitch of around 200 microns (the thickness of the copper layer will typically be around 0.1 to 2 microns). The touch sensor is overall transparent because of the copper wires cover only a relatively small fraction of the area. Furthermore, with relatively large area electrodes (i.e. large compared to the 200 microns pitch of the wire mesh) such as represented in FIG. 4, the wire mesh is barely visible to a user looking through the touch sensor at an underlying screen. That is to say, the wire mesh does not give rise to significant visual artefacts.

FIG. 5 schematically represents a conventional single-sided (single-layer) electrode pattern for a capacitive touch sensor 40. The sensor 40 comprises an array of sensing nodes 42 arranged in a plurality of rows and columns across a two-dimensional sensing surface. In this example there are five rows schematically labelled R1 to R5 (running horizontally for the orientation represented in the figure) and six columns schematically labelled C1 to C6 (running vertically for the orientation represented in the figure). Thus the sensing surface extends horizontally from a first (left) edge 47A adjacent column C1 to a second (right) edge 47B adjacent column C6 and extends vertically from a third (top) edge 47C adjacent row R1 to a fourth (bottom) edge 47D adjacent row R5.

Each sensing node 42 comprises a first electrode 43 and a second electrode 44. The first electrodes are schematically represented in FIG. 5 with darker shading than the second electrodes. A plurality of traces 45 connect respective ones of the first electrodes 43 to a perimeter of the sensing surface, in this case down to the fourth (bottom) edge 47D adjacent row R5. There is a separate trace 45 for each of the first electrodes 43. The respective first electrodes 43 of each row R1 to R5 are electrically connected together outside the surface of the sensing area by external wiring (not shown) connecting to the respective traces 45 at the perimeter of the sensing area. A plurality of further traces 46 interconnect respective ones of the second electrodes 44 in the same column, and the respective further traces also extend down to the perimeter of the sensing area along the fourth edge 47D. Ground traces 48 (schematically represented in FIG. 5 with dotted lines) are provided at locations where traces 45 connecting to the first electrodes 43 and further traces 46 connecting to the second electrodes 46 would otherwise be adjacent.

Thus, in the arrangement represented in FIG. 5 the first electrodes 43 in each row are interconnected (via their respective traces 45 and external wiring) and the second electrodes in each column are interconnected (by the further traces 46) within the sensing area. In this regard the arrangement of electrodes in FIG. 5 provides an array of interconnected rows and columns defining a two-dimensional array of sensing nodes. In effect the sensing nodes 43 of FIG. 5 correspond to the sensing nodes at the crossing points in the two-layer designs of FIGS. 1 to 3, but with electrodes provided on only a single layer of a substrate. Thus, the approach of FIG. 5 can be advantageous in certain circumstances, for example because of simpler manufacturing and/or higher transparency. The sensing element represented in FIG. 5 can be connected to conventional drive circuitry for establishing the position of an object adjacent the sensing surface in accordance with conventional techniques such as discussed above with reference to FIGS. 1 to 3. Thus the sensing element can be used in a mutual-capacitance mode in which capacitive coupling between the respective first electrodes and the second electrodes are measured to identify which sensing nodes are associated with a change in mutual capacitance caused by a proximate object. The sensing elements can also be used in a self-capacitance mode in which the self-capacitance of the respective electrodes are separately measured to identify which sensing nodes are associated with a change in mutual capacitance. In this regard, the interconnection of the electrodes into rows and columns provides a matrix approach which reduces the number of control channels required (as compared to approaches where the individual sensing nodes are coupled to separate measurement channels).

Whilst a single-layer design of the type represented in FIG. 5 can be advantageous from a manufacturing point of view, it requires relatively thin trace circuitry to avoid overly-large areas of insensitivity between columns. For example, the traces 45 connecting from the lower edge to the respective first electrodes 43 of the respective sensor nodes 42 in a given column in a typical implementations may be separated by only 100 microns or so. It is not possible to provide a group of such closely spaced electrodes using a wire-mesh arrangement of the kind represented in FIG. 4 with a pitch of around 200 microns, and simply using a regular grid having a smaller pitch size can be expected to reduce transparency to levels which are unacceptable for many touch-screen applications.

An alternative approach could be to simply replicate the pattern of FIG. 5 with linear electrodes, i.e. using an array of thin copper electrodes deposited on a substrate and extending generally in the vertical direction (for the orientation of in FIG. 5) with appropriate horizontal connections for defining the pattern as appropriate. However, the Inventor has recognised drawbacks with this approach in situations where the sensor is to overlay a display screen (i.e. where the position sensor is incorporated in a touchscreen). In particular, the Inventor has recognised the way in which the electrodes extending generally in the vertical direction of FIG. 5 interact with pixels in the underlying display screen can give rise to distracting effects such as moiré patterning and variations in apparent colour, both across the screen and for different viewing angles, as the electrodes obscure different portions of the underlying pixels.

There is therefore a desire to provide touch sensors with electrode patterns that can be implemented using non-transparent conductors in a single layer design with reduced visible artefacts.

SUMMARY OF THE INVENTION

According to a first aspect of the invention there is provided a sensor element for sensing the position of an object in a first direction and in a second direction, the sensor element comprising: a substrate having an electrode pattern disposed thereon, wherein the electrode pattern comprises a plurality of conductors selectively arranged on a network of lines extending generally in the first direction, wherein each of the lines follows a zigzag pattern comprising an alternating series of first line segments arranged at a first angle to the first direction and second line segments arranged at a second angle to the first direction, and wherein respective ones of the first line segments in each line are co-linear with respective ones of the first line segments in an adjacent line and respective ones of the second line segments in each line are not co-linear with respective ones of the second line segments in an adjacent line.

In accordance with certain embodiments the length of the first line segments is different from the length of the second line segments.

In accordance with certain embodiments the length of the first line segments is greater than the length of the second line segments.

In accordance with certain embodiments the angle between respective ones of the first line segments and the first direction is less than an angle selected from the group comprising: 45 degrees; 40 degrees; 35 degrees; 30 degrees; 25 degrees; 20 degrees; 15 degrees and 10 degrees.

In accordance with certain embodiments the angle between respective ones of the second line segments and the first direction is greater than an angle selected from the group comprising: 45 degrees; 50 degrees; 55 degrees; 60 degrees; 65 degrees; 70 degrees; 75 degrees and 80 degrees.

In accordance with certain embodiments the angle between the first line segments and the second line segments is around 90 degrees.

In accordance with certain embodiments the joins between first line segments and second line segments in one line are at the same locations along the first direction as the joins between first line segments and second line segments in an adjacent line.

In accordance with certain embodiments the electrode pattern further comprises connector portions arranged to selectively connect conductors arranged on adjacent lines of the network of lines together.

In accordance with certain embodiments the connector portions are arranged to have an approximately uniform density across the sensor element.

In accordance with certain embodiments the electrode pattern further comprises gaps arranged to selectively separate conductors arranged on the same line of the network of lines from each other.

In accordance with certain embodiments the gaps are arranged to have an approximately uniform density across the sensor element.

In accordance with certain embodiments, the sensor element further comprises a controller coupled to respective ones of the conductors and arranged to measure changes in a capacitive coupling associated with the conductors.

In accordance with certain embodiments the controller is further operable to determine the position of an object based on the measured changes in the capacitive coupling associated with the conductors.

According to a second aspect of the invention there is provided a touch screen comprising the sensor element of the first aspect of the invention and a display screen, wherein the electrode pattern is arranged over the display screen.

In accordance with certain embodiments the display screen comprises an array of pixels arranged in columns extending along the first direction and rows extending along the second direction, and wherein each pixel is separated along the second direction into a plurality of sub-pixels for representing different colours of the display screen.

In accordance with certain embodiments the combined extent of one first line segment and one second line segment along the first direction is or is approximately an integer multiple of the extent of one of the pixels in the first direction.

In accordance with certain embodiments the separation between adjacent lines along the second direction is or is approximately an integer multiple of the extent of one of the sub-pixels in the second direction.

In accordance with certain embodiments the separation between adjacent lines along the second direction is or is approximately an integer multiple of the extent of one of the sub-pixels in the second direction that is different from the number of sub-pixels in a pixel.

According to a third aspect of the invention there is provided a method of manufacturing a sensor element for sensing the position of an object in a first direction and in a second direction, the method comprising: disposing an electrode pattern on a substrate, wherein the electrode pattern comprises a plurality of conductors arranged on a network of lines extending generally in the first direction, wherein each of the lines follows a zigzag pattern comprising an alternating series of first line segments arranged at a first angle to the first direction and second line segments arranged at a second angle to the first direction, and wherein respective ones of the first line segments in each line are co-linear with respective ones of the first line segments in an adjacent line and respective ones of the second line segments in each line are not co-linear with respective ones of the second line segments in an adjacent line.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which.

DETAILED DESCRIPTION

Figure 6:
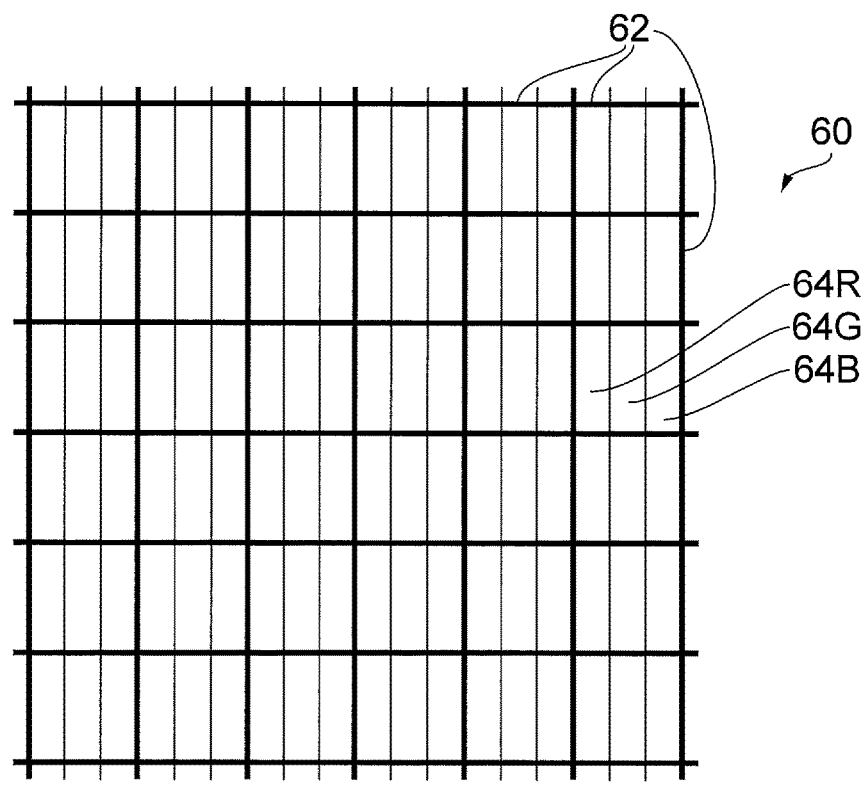
FIG. 6 is a schematic representation of a portion of display screen of the kind often used in conjunction with capacitive touch sensors to provide a touch sensitive display screen.

FIG. 6 is a schematic representation of a portion of display screen 60 of the kind often used in conjunction with capacitive touch sensors to provide a touch sensitive display screen. As is well established, the display screen 60 comprises a plurality of pixels 62. The portion of the display 60 represented in FIG. 6 comprises a six-by-six array of pixels 62. It will be appreciated the display screen will typically contain a larger number of pixels extending over a larger area in accordance with conventional display screen technologies. The display screen 60 represented in FIG. 6 is a colour-screen and each pixel 62 comprises three differently coloured sub-pixels. In this example the screen is based on RGB colours and so each pixel comprises a red sub-pixel 64R, a green sub-pixel 64G and a blue sub-pixel 64B, as schematically represented in the figure. It will be appreciated the display screen may operate in accordance with any established display screen technology, for example based on a thin film transistor display technology.

Figure 5:
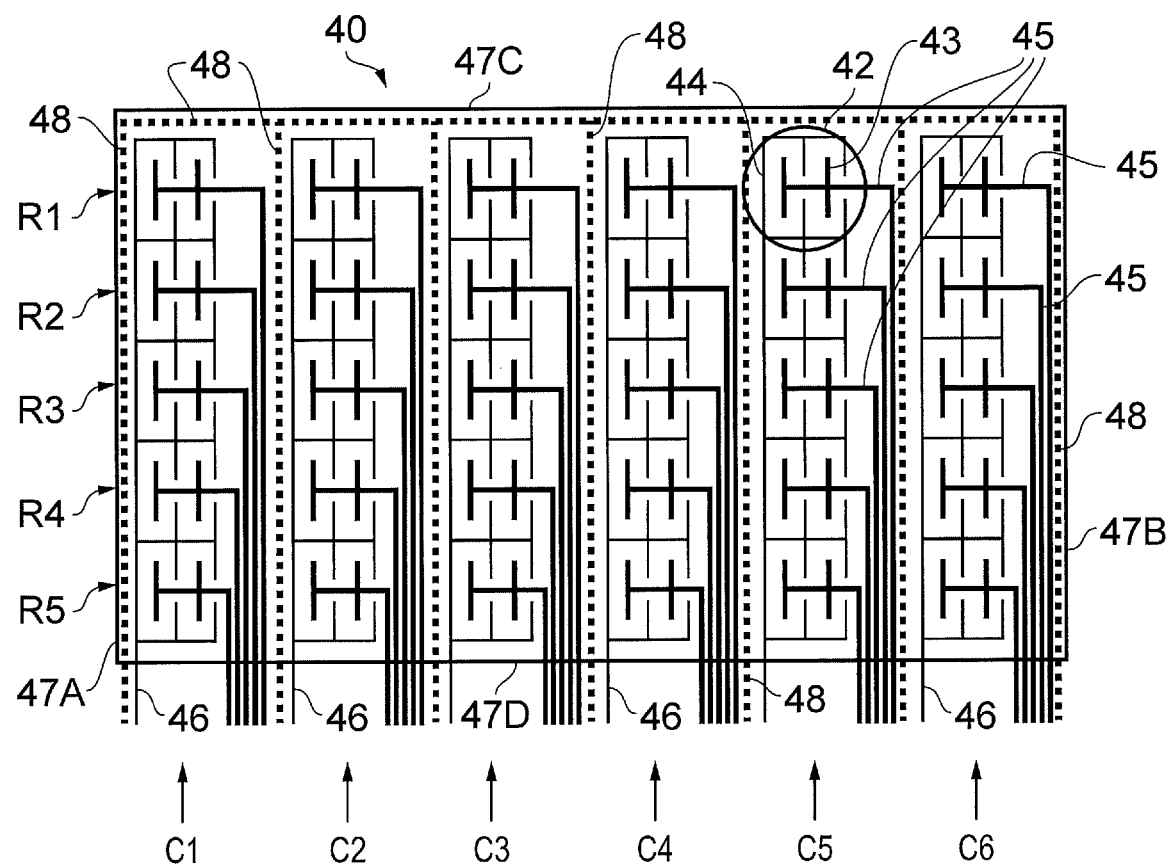
FIG. 5 schematically illustrates a conventional single-sided electrode pattern for a two-dimensional capacitive sensor.

It is often desirable for electrical connections to a sensor element comprising a pattern of electrodes on a substrate to be made along a single edge of the sensor element. For an orientation in which this connection edge is at the bottom of the sensor element, the electrode patterns will typically comprise electrodes extending generally in vertical direction (i.e. to/away from the connection edge) with horizontal connections between the vertical electrodes to define an appropriate pattern, for example a pattern such as represented in FIG. 5. However, as noted above a straightforward configuration of linear electrodes (e.g. directly following the pattern of FIG. 5) overlaying a display screen comprising colour pixels (e.g. as represented in FIG. 6) can give rise to distracting effects. Typical dimensions for a pixel of a display screen of the kind represented in FIG. 6 might be around 100 microns square with the sub-pixels having dimensions of around 33 microns×100 microns. A typical copper electrode to be used in a transparent screen might have the width of around 3 microns. Thus, and electrodes running vertically over the display screen of FIG. 6 will obscure approximately 10% of one colour of sub-pixel. Furthermore, depending on the pitch of the vertical electrodes defining the touchscreen (i.e. separation between electrodes running generally in the same direction), adjacent electrodes may obscure different coloured sub-pixels. It is this which can give rise to some of the distracting effects described above.

In order to address these issues, the Inventor has established new patterns of electrodes which extend generally in a first direction (e.g. vertical) and may be selectively interconnected along a second direction (e.g. horizontally) and provided with gaps along the first direction to define a desired electrode pattern for a touchscreen.

Figure 7:
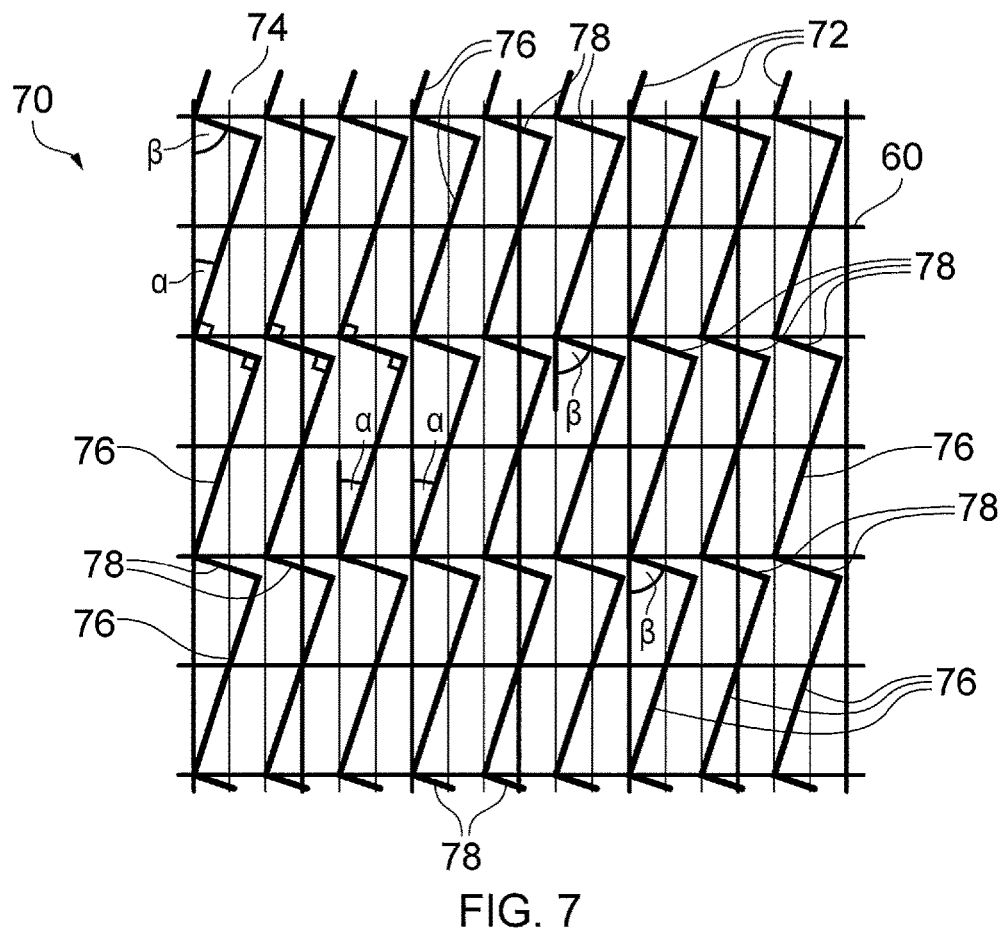
FIGS. 7, 8 and 9 schematically illustrates some aspects of a single-sided electrode pattern for a two-dimensional capacitive sensor in accordance with certain embodiments of the invention.

FIG. 7 is a diagram schematically representing a portion of a sensor element 70 comprising electrodes arranged on a network of lines 72 in accordance with certain embodiments of the invention and an underlying display screen 60 of the kind represented in FIG. 6. As noted above, the display screen may be based on any conventional display screen technology. The portion of the sensor element 70 represented in FIG. 6 comprises a portion overlying a six-by-six array of pixels 62 in the underlying display 60. It will be appreciated the sensitive surface of the sensor element 70 and the display screen 60 will typically extend over a larger area and contain a larger number of pixels.

In the sensor element 70 of FIG. 7, conductor material is selectively arranged along the lines 72 to define electrodes extending generally in a first direction (vertical in the orientation of FIG. 7). These vertical lines may be interconnected in a second direction (horizontal in the orientation of FIG. 7) as desired to define an appropriate electrode pattern. In some respects the arrangement of the network of lines 72 represented in FIG. 7 provides a template on which conductive material may be selectively disposed to define electrodes extending generally in a first direction. Whether or not electrodes actually follow some or all of any given one of the lines 72 in a given implementations will depend on the underlying electrode pattern to be defined. The conductive material defining the electrodes may be disposed on a substrate 74 of the sensor element 72 to follow selected parts of the network of lines 72 in accordance with any known techniques for providing conductive material on a substrate, for example lithographic-based techniques. It is assumed in this example the width of the individual lines 72 comprising the network of lines is around 3 to 5 microns.

However, it will be appreciated that other sizes can be selected according to the implementation at hand and having regard to established practices of providing electrodes on a substrate. In this regard, it will be appreciated what is significant for certain embodiments of the invention is not the manner of construction or deposition of the electrodes (for example in terms of the materials of the electrodes and the substrate), or even the general large-scale pattern of electrodes that is desired to provide the touch sensitive aspects of the sensor element, and these may all be generally conventional. What is significant in accordance with certain embodiments is the manner in which electrodes extending in a first direction follow lines arranged in a generally zigzag (saw-tooth) pattern instead of straight lines, and the specific manner in which the zigzag pattern is arranged, as discussed further below. It is this zigzag configuration that has been found by the Inventor to provide a way of providing electrodes extending generally in a first direction to form the basis for an electrode configuration of a touch sensitive sensor. That is to say, the zigzag network of lines 72 represented in FIG. 7 provide a general template according to which conductive material may be deposited on the substrate 74 to define electrodes running in a vertical direction, but it will be appreciated that not all portions of the network of lines will be provided with conductive material, rather the conductive material be selectively arranged along the lines to define the underlying electrode pattern.

Thus the sensor element 70 is for sensing the position of an object in a first direction (vertical in the orientation of FIG. 7) and a second direction (horizontal in the orientation of FIG. 7). For example, the object may be a finger or stylus place by a user over a relevant part of the underlying display 60. The sensor element comprises a substrate 74 having an electrode pattern disposed thereon to define an array of sensor nodes (i.e. regions over which the sensor element is sensitive the presence of an object. The electrode pattern comprises a plurality of conductors arranged on a network of lines 72 extending generally in the first direction. Each of the lines 72 follows a zigzag (saw-tooth) pattern comprising an alternating series of first line segments 76 arranged at a first angle ($\alpha$) to the first direction and second line segments 78 arranged at a second angle ($\beta$) to the first direction. A significant aspect of the arrangement of the respective line segments comprising the network of lines is that respective ones of the first line segments in each line are co-linear with respective ones of first line segments in adjacent lines. The angled nature of the first line segments with respect to the first direction (the first direction being parallel to the boundaries between neighbouring sub-pixels in the display) means the electrode material disposed along the lines do not solely obscure one particular colour of sub-pixel throughout a column as they would if they simply ran vertically. Furthermore, by having the first line segments in neighbouring lines co-aligned with each other, the overall pattern of lines is broadly similar to that of a continuous array of straight lines extending across the sensor element at an angle $\alpha$ to the first direction. This is an arrangement which the Inventor has recognised to have low visibility to a user (i.e. it is an arrangement that does not give rise to significant visible artefacts), but does not allow for electrodes extending generally in the first direction, which is what is desired for many electrode patterns, such as the example arrangement represented in FIG. 5. Accordingly, the zigzag nature of the lines represented in FIG. 7 is provided so that despite being made up of line segments that are angled with respect to the first direction, the lines nonetheless generally extend in the first direction.

As can also be seen in the arrangement of FIG. 7, respective ones of the second line segments 78 in each line are not co-linear with respective ones of the second line segments 78 in an adjacent line. This is a configuration that helps to have the joins between first line segments and second line segments in one line at the same locations along the first direction as the joins between first line segments and second line segments in an adjacent line. That is to say, each line matches its neighbouring line in overall shape but with an offset in the second direction orthogonal to the first direction.

In the arrangement of FIG. 7, the extent of a first line segment and a second line segment along the first direction (i.e. the extent of one "tooth" of the saw-tooth/zigzag along the first direction) corresponds with an integer number of pixels in the vertical direction. In this case the integer multiple is 2—i.e. each "tooth" spans two pixels. This has been found to reduce visible artefacts associated with electrode/conductor material selectively disposed on the substrate 74 according to the network of lines 72.

Furthermore, the separation of adjacent lines in the second direction correspond with an integer multiple of the width of sub-pixels along this direction, in this case the integer multiple is 2. More generally, the separation of adjacent lines in the second direction may correspond with an integer multiple of the width of sub-pixels along the first direction does not correspond to the number of sub-pixels in a pixel of case (in this case three). This can help ensure that different lines at different locations across the display do not always partially obscure the same combinations of pixels and this can help to "average out" the visual impact of conductor material deposited along the lines 72.

In the arrangement of FIG. 7 the zigzag patterning is represented as being aligned to the underlying pixel arrangement. For example, each "tooth" shown extending across two complete pixels with the ends of each tooth arranged at a boundary between two sub-pixels. This arrangement is shown purely to aid an understanding of the relative geometries of the first and second line segments with respect to the underlying pixels and sub-pixels in accordance with certain embodiments. In practice, an arrangement of lines having this geometry may be arranged arbitrarily (e.g. in terms of translational offset) with respect to the boundaries between the underlying pixels. That is to say, there is no requirement for the substrate 74 to the arranged over the display 60 with any particular degree of precision to obtain the reduced visible artefacts associated with certain embodiments of the disclosure.

A consequence of the specific arrangement represented in FIG. 7 is that the respective first and second line segments are of different lengths, and in particular the first line segments are longer than the second line segments.

Assuming the pixels 62 in the display 60 are generally square and divided into three sub-pixels as represented in FIG. 6, and with the scale of the zigzag lines 72 and the separation between neighbouring zigzag lines being as set out in FIG. 7, the angle α at which the first line segments are inclined to the first direction is around arctan ⅓, which is around 18 degrees. In this particular example the first and second line segments are generally orthogonal to each other, and consequently the angle β at which the second line segments are inclined to the first direction is around 90—α, which is around 72 degrees in the example of FIG. 7. However, it will be appreciated that different angles may be used for different configurations (e.g. according to the relative size of each tooth of the zigzag lines and the underlying pixels). Thus the angle α between respective ones of the first line segments and the first direction may, according to different implementations, be less than an angle selected from the group comprising: 45 degrees; 40 degrees; 35 degrees; 30 degrees; 25 degrees; 20 degrees; 15 degrees and 10 degrees. Likewise, the angle β between respective ones of the second line segments and the first direction may be greater than an angle selected from the group comprising: 45 degrees; 50 degrees; 55 degrees; 60 degrees; 65 degrees; 70 degrees; 75 degrees and 80 degrees according to the implementation at hand.

It is not necessary for the first and second line segments to be orthogonal, but having an angle of around 90° between the first line segments and the second line segments has been found to be appropriate. If the angle were to be significantly less than 90° it can be harder to clearly deposit the conductor along the lines without rounding the angle, which may become visible to a user. If the angle were to be significantly more than 90°, there would need to be a great separation between the ends of respective pairs of co-linear first line segments in neighbouring lines, and this may also increase visibility for conducting material deposited in such a way as to selectively follow portions of the array of lines 72.

Thus in accordance with certain embodiments of the invention a sensor element for a touch sensor is provided for use in a touch screen. The sensitive area of the touch sensor is defined by an arrangement of conductors deposited on a substrate. The overall/large scale (i.e. a scale on the order of the sensitive area of the sensor element) pattern of the electrodes defining the sensing area of the sensor element may follow conventional design techniques (e.g. conforming generally to the overall pattern shown in FIG. 5 in one example), but on a smaller scale (i.e. a scale on the same order as the scale of pixels of the display), the individual sections of conductive material extending generally in a first direction follow a generally saw-tooth/zigzag pattern. More generally, adjacent electrodes extending in the first direction are arranged so that parallel first line segments of their respective zigzags are co-linear with corresponding first line segments of the zigzags of neighbouring electrodes. In some respects this approach based on disposing conductive material on a substrate so as to follow a network of zigzag lines to provide electrodes extending generally in a first direction can be seen as proving an overall design template according to which electrodes are selectively disposed on the substrate to build a desired conductor pattern.

Figure 8:
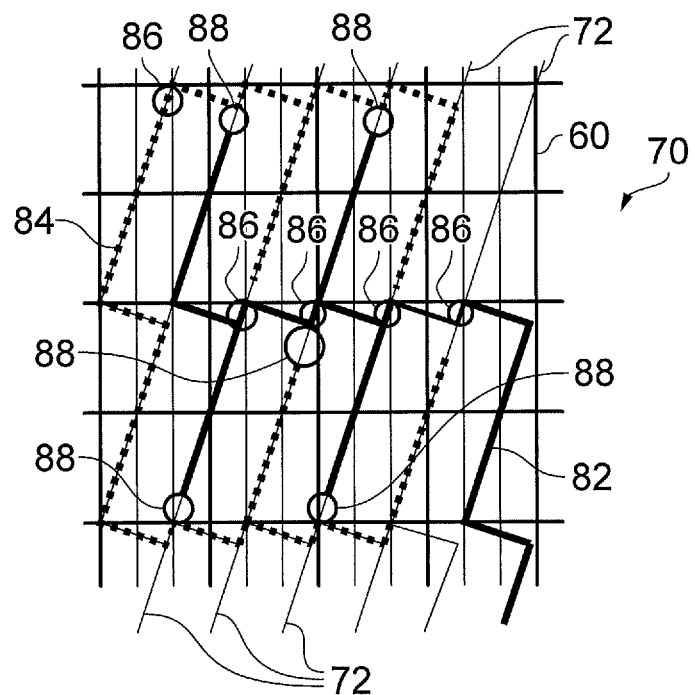

An example of using the principles described herein to provide a portion of a desired conductor/electrode pattern for a touch sensor based on the network of lines represented in FIG. 7 is schematically shown in FIG. 8.

FIG. 8 is a diagram schematically representing a portion of the sensor element 70 represented in FIG. 7. FIG. 8 is similar to, and will be understood from, FIG. 7. However, whereas FIG. 7 shows a portion corresponding to a six-by-six array of pixels 62 in the underlying display 60, FIG. 8 shows a slightly smaller portion corresponding to a four-by-four array of pixels 62 in the underlying display 60. Furthermore, FIG. 8 additionally shows an arrangement of a first electrode 82 (shown solid in FIG. 8) and a second electrode 84 (shown dashed) deposited on the substrate 74 of the sensor element 70. As previously discussed, the electrodes may comprise conductors, for example made of a thin (e.g. 1 to 10 microns wide) non-transparent conductive material, such as copper, deposited on the substrate 74 to a desired pattern using conventional techniques (such as lithography/printing). The desired pattern will depend on the overall design of the sensor element, which may be broadly based on conventional designs, but using zigzag lines as discussed above instead of straight lines.

For the particular example represented in FIG. 8 it is assumed the electrode pattern provided by the first electrode 82 and the second electrode 84 are intended to correspond with a section of an overall pattern providing a single sensor node formed from an interdigitated series of conductors based on the general arrangement of electrodes represented in the vicinity of the circle 42 shown in FIG. 5 at the intersection between row R1 and column C5. As can be seen in FIG. 8 the electrode patterning comprising the first and second electrodes 82, 84 is arranged to generally follow the underlying pattern of the network of lines 72, but with some additional interconnections between conductor material on adjacent lines and with gaps between conductor material on a given line so as to define the desired pattern (namely an interdigitated series of conductors). Some of the interconnections between conductor material on adjacent lines 72 are shown within the circles identified by reference numeral 86 and some of the gaps in conductor material on a single line are shown within the circles identified by reference numeral 88. Thus, the arrangement of the first electrode 82 and the second electrode 84 represented in FIG. 8 provides a sensor node of the kind identified by reference numeral 42 in FIG. 5, but based on electrodes that follow zigzag lines instead of straight lines (aspects of electrodes associated with neighbouring sensor nodes are not shown in FIG. 8 for simplicity). The Inventor has recognised this approach can provides the same functionality as arrangements based on straight-line conductors, such as shown in FIG. 5, but with reduced visual artefacts associated with the conductive material providing the electrodes defining the sensitive area of the sensor element.

In the example of FIG. 8, the various gaps 88 and interconnections 86 are relatively small, for example less than 10% or 5% of the length of the line segments in which they are provided. This can help reduce their visibility. Furthermore, the interconnections 86 are generally provided by extensions of the respective first line segments of one of the network of lines to meet the conductor material deposited on an adjacent one of the network of lines, which further helps reduce their visibility. From a manufacturing perspective, it can be helpful for gaps provided between adjacent section of conductive material on the substrate to have at least a minimum size, for example at least 20 microns or 30 microns. This can help reduce the likelihood of short-circuit failures arising from the manufacturing process and so increase production yield. This applies for both gaps between conductor material arranged on a single line according to a desired electrode pattern (for example the gaps 88 schematically represented in FIG. 8) and the gaps between conductor material arranged on adjacent lines (e.g. the gaps between the co-aligned first line sections 76 of neighbouring lines 72).

Figure 9:
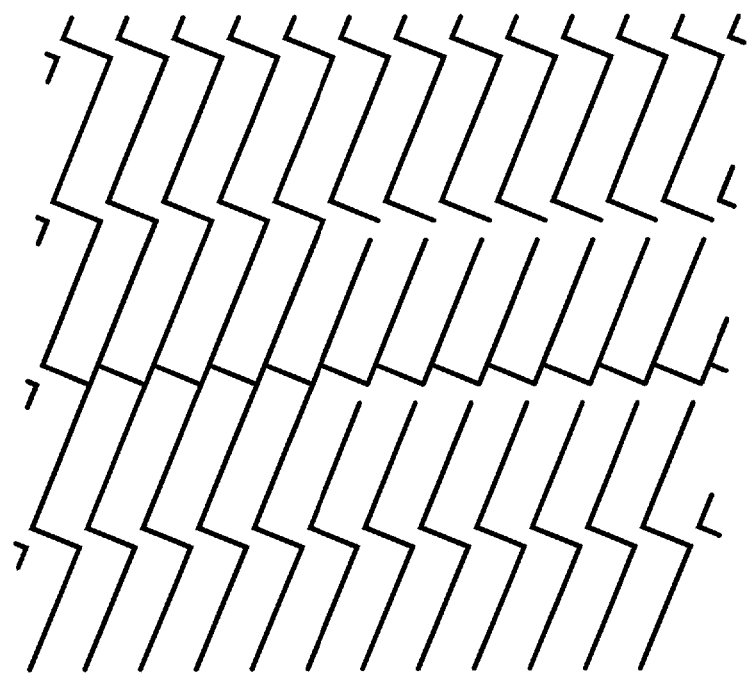

It will be appreciated the arrangement shown in FIG. 8 is provided purely for the sake of example to identify how electrodes may be arranged in accordance with the network of lines 72 represented in FIG. 7 to define a desired pattern. For example, whereas the approach adopted in FIG. 8 provides a sensor node comprising a series of interdigitated portions of a first electrode 82 and second electrode 84 on a scale of four-by-four pixels, in general it can be expected in practice the size of sensor nodes will be larger. An example arrangement of conductive material providing electrodes for a larger portion of a sensor according to another example is schematically represented in FIG. 9. More generally, an arrangement of conductive material deposited in accordance with the network of lines 72 and the gaps and interconnections associated therewith may be provided to define an electrode pattern based on conventional design techniques but the using zigzag lines having the characteristics described herein instead of straight lines.

As noted above, a desired electrode pattern can be obtained by depositing conductive material to generally follow an arrangement of lines 72 as discussed above, but with additional gaps and interconnections provided in accordance with the desired overall electrode pattern. In some situations there may be areas of a pattern which comprise a relatively high number of gaps/interconnections, for example in the vicinity of a sensor node comprising interdigitated electrodes, and some areas which have a relatively low number of gaps/interconnections, for example in the vicinity of an area which provides an earth plane. In such situations it may be helpful in some cases to arrange for a relatively uniform distribution of gaps/interconnections across the surface of the substrate. For example, where there is flexibility in where to interconnect two lines or where to break (i.e. introduce a gap) into a single line, an approach may be taken to generate a relatively uniform distribution of gaps 88 and interconnection lines 86 across the surface of the sensor. For example, an earth plane region may be provided by an arrangement of conductor material following continuously along the lines 72 in a region of the substrate. In principle these lines could be interconnected using external circuitry. However, adjacent lines could also be interconnected on the substrate, for example using one or more interconnections between respective pairs of adjacent lines. In this regard, if a unit area of the sensor pattern away from the earth plane typically has a given number of interconnections, the same or similar number of interconnections may be provided in a corresponding unit area in the region of the earth plane. Likewise, although not strictly necessary, additional gaps may be introduced into the electrodes comprising the earth plane (with appropriate interconnections to neighbouring lines to ensure overall connectivity by in effect using neighbouring lines to bridge the gaps) to provide for a relatively uniform density of gaps within the sensor plane. That is to say, interconnections and gaps which are not strictly required to define a desired arrangement of electrodes for sensing, may nonetheless be introduced into the pattern to provide an arrangement in which there is a relatively uniform density of gaps and/or interconnections in different regions of the sensor surface. The inventor have recognised this approach can also help reduce visibility of the pattern. In general, the inventor has found a reasonable compromise between uniformity and simplicity of design may be achieved for a target uniformity corresponding to a situation in which if the sensing area is notionally divided into a number or regions, for example regions having a size on the order of a hundred microns by a hundred microns, e.g. 70 microns by 200 microns, the number of cuts and/or interconnections in each region is arranged to be less than a given percentage, for example less than 20%, away from the average number of cuts and/or interconnections for the regions.

Figure 1:
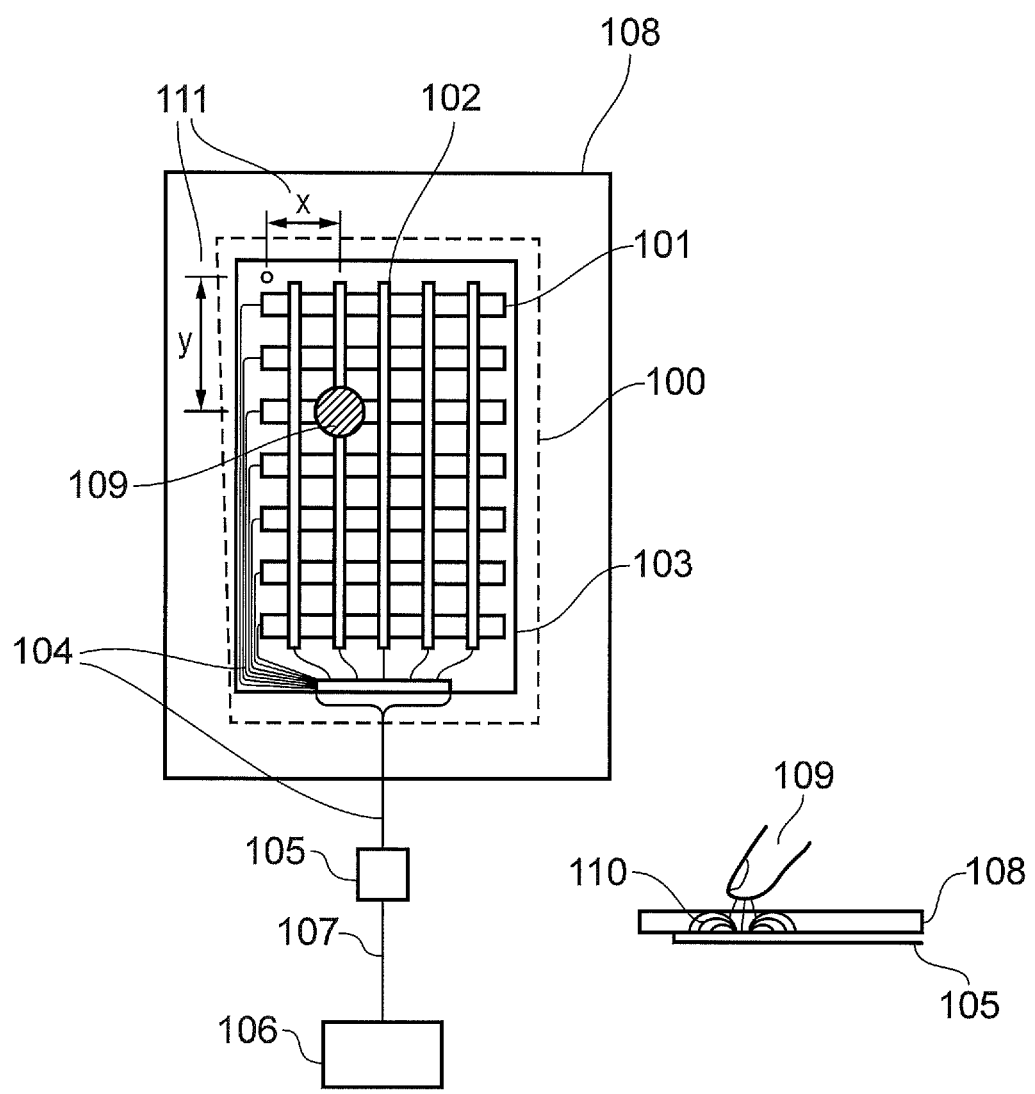
FIG. 1 schematically illustrates a typical touchscreen/touch sensor system.
Figure 2:
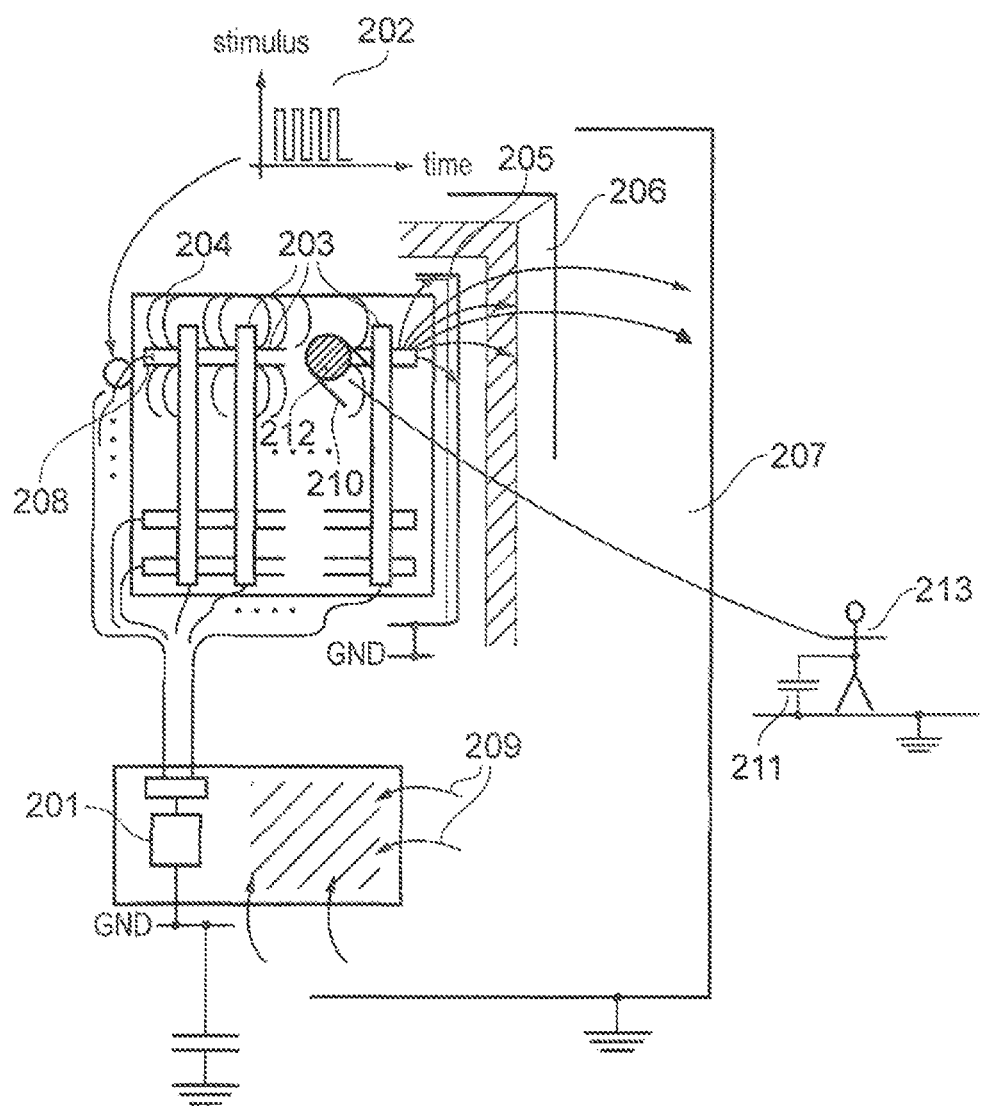
FIG. 2 schematically illustrates a typical self-capacitance type touchscreen system.
Figure 3:
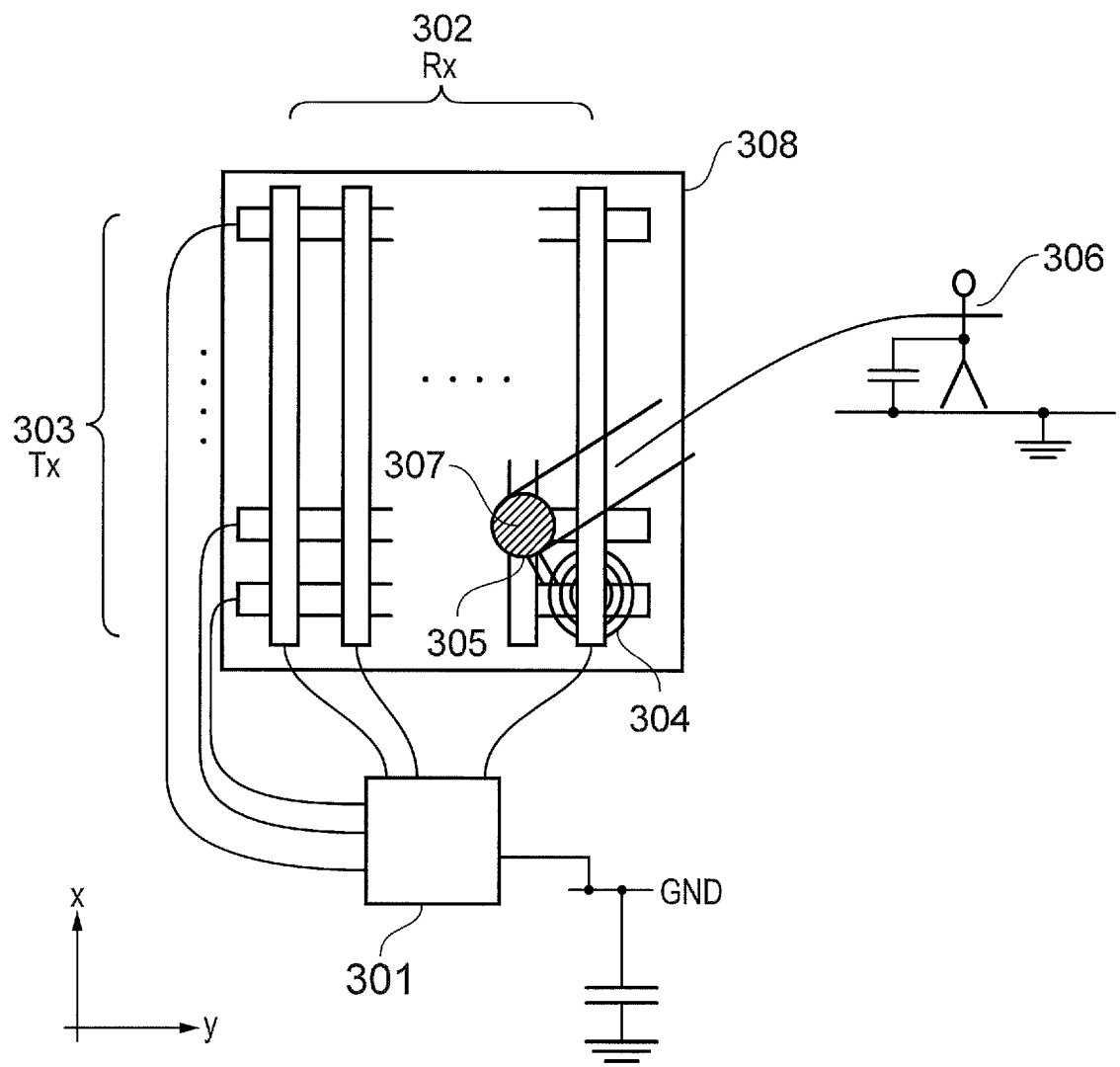
FIG. 3 schematically illustrates a typical mutual-capacitance type touchscreen system.
Figure 4:
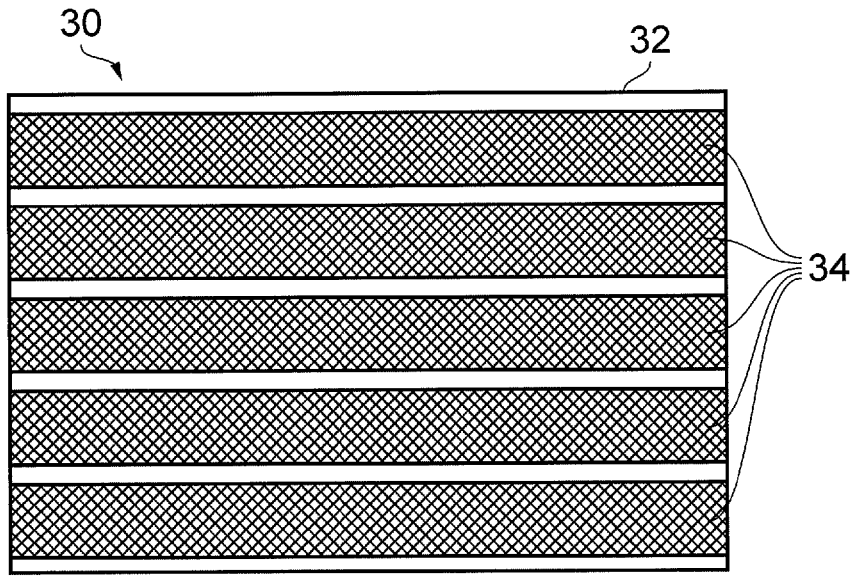
FIG. 4 schematically illustrates an approach for providing electrodes for a touch sensor using a wire mesh.

The sensing element (sensing surface) represented in FIGS. 6 to 9 can be connected to conventional drive circuitry for establishing the position of an object adjacent the sensing surface in accordance with conventional techniques such as discussed above with reference to FIGS. 1 to 3. Thus the sensing element can be used in a mutual-capacitance mode in which capacitive coupling between the respective first electrodes and the second electrodes are measured to identify which sensing nodes are associated with a change in mutual capacitance caused by a proximate object. The sensing elements can also be used in a self-capacitance mode in which the self-capacitance of the respective electrodes are separately measured to identify which sensing nodes are associated with a change in mutual capacitance. In this regard it will be appreciated the interconnection of the electrodes to define rows and columns provides a matrix approach which reduces the number of control channels required in accordance with conventional touch-sense of techniques. More generally, it will be appreciated that aspects of the sensor element 70 and its operation to provide position measurements which are not described in detail herein may be implemented in accordance with any conventional techniques.

It will further be appreciated the electrodes and display pixels may be referred to herein as row (or horizontal) electrodes/pixels and column (or vertical) electrodes/pixels to provide a convenient way of distinguishing the different directions along which the electrodes/pixels extend. These terms are not intended to indicate any specific orientation while a sensor is in use. In general the term "row" may be used to refer to electrodes/pixels extending in a horizontal direction for the orientations represented in the figures while the term "column" may be used to refer to electrodes/pixels extending in a vertical direction in the orientations represented in the figures. However, if a sensor in accordance with an embodiment of the invention is rotated relative to the representation identified in the figures, what are referred to herein as rows will in effect become vertical, and what are referred to herein as columns will in effect become horizontal, but it will of course be appreciated this will have no impact on the operation of the sensor. It will further be appreciated that whilst the described embodiments have assumed a flat regular square array of display pixels, the same principles apply for non-square arrays. Furthermore, the plane of the sensing surface need not be flat, and the sensing surface may instead be conformed to a three-dimensional surface. In this regard it will be appreciated terms specifying particular directional arrangements, such as first direction, second direction, and co-linear/aligned, should be taken to apply within the plane of the relevant surface (for example, line segments which are co-linear on a sensing surface, may not be co-linear in an absolute sense in a Cartesian 3D space because the sensing surface is curved.)

Figure 10:
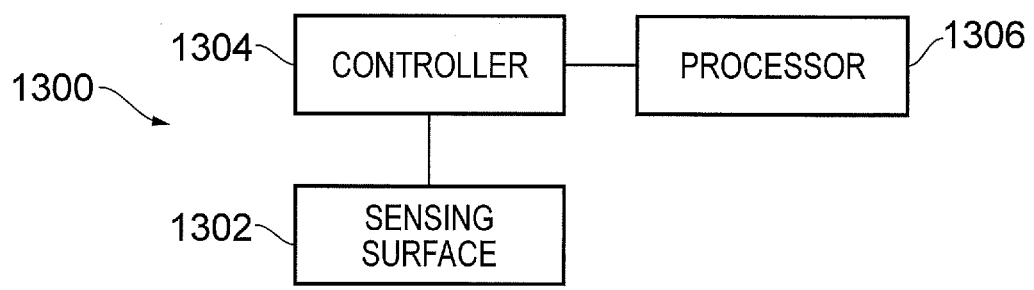
FIG. 10 schematically shows some components of a touch sensor according to an embodiment of the invention.

FIG. 10 schematically shows some components of a touch sensor 1300 according to an embodiment of the invention. The sensor 1300 comprises a sensing surface 1302, for example in accordance with any of the embodiments of the invention such as discussed above, coupled to a controller chip 1304. The controller chip 1304 may, for example, be a conventional "off the shelf" controller chip configured to determine the occurrence of and report a location of a touch using conventional capacitive sensing techniques. The sensor 1300 further comprises a processor 1306 arranged to receive a reported position estimate from the controller 1304 and to convert the reported position estimate to a physical position estimate in accordance with the above-describe techniques. The processor 1306 may, for example, comprise a suitably programmed general purpose microprocessor, or field programmable gate array, or an application specific integrated circuit. Furthermore, although presented in FIG. 13 as two separate elements, it will be appreciated the functionality of the controller 1304 and the processor 1306 may be provided in a single element, for example, a single suitably-programmed microprocessor.

Thus there has been described a touch sensor that comprises a sensor element for sensing the position of an object over a display screen in a first direction and in a second direction. The sensor element comprises a substrate having an electrode pattern disposed thereon to define an array of sensor nodes. The electrode pattern comprises a plurality of conductors arranged to follow portion of a network of lines extending generally in the first direction, wherein each of the lines follows a zigzag (saw-tooth) pattern comprising an alternating series of first line segments arranged at a first angle to the first direction and second line segments arranged at a second angle to the first direction, and wherein respective ones of the first line segments in each line are co-linear with respective ones of the first line segments in an adjacent line. Such a configuration leads to a reduced visibility of the conductors overlying the display screen.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. A sensor element for sensing the position of an object in a first direction and in a second direction, the sensor element comprising: a substrate having an electrode pattern disposed thereon, wherein the electrode pattern comprises a plurality of conductors selectively arranged on a network of lines extending generally in the first direction, wherein each of the lines follows a zigzag pattern comprising an alternating series of first line segments arranged at a first angle to the first direction and second line segments that are shorter than the first line segments and arranged at a second angle to the first direction, and wherein respective ones of the first line segments in each line are co-linear in a direction diagonal with respect to the first direction with respective ones of the first line segments in an adjacent line and respective ones of the second line segments in each line are not co-linear in a direction diagonal with respect to the first direction with respective ones of the second line segments in an adjacent line, and wherein the ends of the first and second line segments are defined by joins between the first and second line segments.

2. The sensor element of claim 1, wherein the angle between respective ones of the first line segments and the first direction is less than an angle selected from the group comprising: 45 degrees; 40 degrees; 35 degrees; 30 degrees; 25 degrees; 20 degrees; 15 degrees and 10 degrees.

3. The sensor element of claim 1, wherein the angle between respective ones of the second line segments and the first direction is greater than an angle selected from the group comprising: 45 degrees; 50 degrees; 55 degrees; 60 degrees; 65 degrees; 70 degrees; 75 degrees and 80 degrees.

4. The sensor element of claim 1, wherein the angle between the first line segments and the second line segments is around 90 degrees.

5. The sensor element of claim 1, wherein the joins include a first join between first line segments and second line segments in one line are at the same locations along the first direction as a second join between first line segments and second line segments in an adjacent line.

6. The sensor element of claim 1, wherein the electrode pattern further comprises connector portions arranged to selectively connect conductors arranged on adjacent lines of the network of lines together.

7. The sensor element of claim 6, wherein the connector portions are arranged to have an approximately uniform density across the sensor element.

8. The sensor element of claim 1, wherein the electrode pattern further comprises gaps arranged to selectively separate conductors arranged on the same line of the network of lines from each other.

9. The sensor element of claim 8, wherein the gaps are arranged to have an approximately uniform density across the sensor element.

10. The sensor element of claim 1, further comprising a controller coupled to respective ones of the conductors and arranged to measure changes in a capacitive coupling associated with the conductors.

11. The sensor element of claim 10, wherein the controller is further operable to determine the position of an object based on the measured changes in the capacitive coupling associated with the conductors.

12. A touch screen comprising the sensor element of claim 1, in which the electrode pattern is arranged over a display screen.

13. The touch screen of claim 12, wherein the display screen comprises an array of pixels arranged in columns extending along the first direction and rows extending along the second direction, and wherein each pixel is separated along the second direction into a plurality of sub-pixels for representing different colours of the display screen.

14. The touch screen of claim 13, wherein the combined extent of one first line segment and one second line segment along the first direction is or is approximately an integer multiple of the extent of one of the pixels in the first direction.

15. The touch screen of claim 13, wherein the separation between adjacent lines along the second direction is or is approximately an integer multiple of the extent of one of the sub-pixels in the second direction.

16. The touch screen of claim 15, wherein the separation between adjacent lines along the second direction is or is approximately an integer multiple of the extent of one of the sub-pixels in the second direction that is different from the number of sub-pixels in a pixel.

17. A method of manufacturing a sensor element for sensing the position of an object in a first direction and in a second direction, the method comprising: disposing an electrode pattern on a substrate, wherein the electrode pattern comprises a plurality of conductors arranged on a network of lines extending generally in the first direction, wherein each of the lines follows a zigzag pattern comprising an alternating series of first line segments arranged at a first angle to the first direction and second line segments that are shorter than the first line segments and arranged at a second angle to the first direction, and wherein respective ones of the first line segments in each line are co-linear in a direction diagonal with respect to the first direction with respective ones of the first line segments in an adjacent line and respective ones of the second line segments in each line are not co-linear in a direction diagonal with respect to the first direction with respective ones of the second line segments in an adjacent line, and wherein the ends of the first and second line segments are defined by joins between the first and second line segments.

* * * * *